United States Patent [19]

Abraham et al.

[11] Patent Number: 6,020,427
[45] Date of Patent: Feb. 1, 2000

[54] THERMOPLASTIC VULCANIZATES OF CARBOXYLATED NITRILE RUBBER AND POLYESTER THERMOPLASTICS

[75] Inventors: Tonson Abraham, Strongsville; Sabet Abdou-Sabet, Akron, both of Ohio

[73] Assignee: Advanced Elastomer Systems, L.P., Akron, Ohio

[21] Appl. No.: 08/987,961

[22] Filed: Dec. 10, 1997

[51] Int. Cl.$^7$ ..................................................... C08L 33/20
[52] U.S. Cl. ............................ 525/67; 525/64; 525/92 A; 525/92 E; 525/92 F; 525/133; 525/148; 525/166; 525/173; 525/175
[58] Field of Search ............................ 525/64, 92 F, 166, 525/175, 92 A, 173, 67, 92 E, 148, 133

[56] References Cited

U.S. PATENT DOCUMENTS

| | | |
|---|---|---|
| 4,141,863 | 2/1979 | Coran et al. . |
| 4,226,953 | 10/1980 | Coran et al. . |
| 4,666,972 | 5/1987 | Kohler et al. . |
| 5,310,792 | 5/1994 | Inoue ........................................ 525/64 |
| 5,397,839 | 3/1995 | Patel . |
| 5,550,190 | 8/1996 | Hasegawa et al. . |
| 5,637,407 | 6/1997 | Hert et al. . |

OTHER PUBLICATIONS

An article entitled "Toughened Poly(butylene terephthalate)s and Blends Prepared by Simultaneous Chain Extension, Interfacial Coupling, and Dynamic Vulcanization Using Oxazoline Intermediates" Christof Worner, Philipp Muller, Rolf Mulhaupt, Freiburger Materialforschungszentrum and Institu for Makromolekulare Chemie, Stefan–Meier–Str. 21, D–79104, Freiburg i., Br., pp. 633–642, published Oct. 1–6, 1997.

*Primary Examiner*—Patricia A. Short
*Attorney, Agent, or Firm*—Daniel J. Hudak; William A. Skinner

[57] ABSTRACT

Low oil swell, processable carboxylated nitrile rubber thermoplastic vulcanizate compositions having high melting points are made utilizing a processing aid, for example, maleated polyethylene, and addition type curing agents such as bisoxazolines or bisimidazolines. The compositions generally contain polar thermoplastic high melting point crystalline polymers such as polyester as a continuous phase with the carboxylated nitrile rubber being dispersed therein.

18 Claims, No Drawings

THERMOPLASTIC VULCANIZATES OF CARBOXYLATED NITRILE RUBBER AND POLYESTER THERMOPLASTICS

FIELD OF INVENTION

The present invention relates to thermoplastic vulcanizates (TPVs) containing high melting point thermoplastics such as polyesters, polycarbonates, or polyester block copolymers such as segmented polyester-ether copolymers, and small particles of cured carboxylated nitrile rubber dispersed therein. The present invention further relates to the use of processing aids and desirably addition type curing agents whereby the thermoplastic vulcanizates have properties similar to those of thermoset nitrile rubber.

BACKGROUND OF THE INVENTION

Heretofore, many types of thermoplastic vulcanizates were known. More specifically, U.S. Pat. No. 4,226,953 to Coran and Patel relates to thermoplastic compositions comprising blends of styrene-acrylonitrile (SAN) resin and nitrile rubber of high gel content.

U.S. Pat. No. 4,141,863 to Coran et al. relates to a thermoplastic composition comprising blends of cross-linked rubber and thermoplastic linear crystalline polyester using thermoplastic polyesters having a softening point above 50° C. Rubbers include natural or synthetic diene rubber polyurethane rubber and nitrile rubber. The blends may also contain plasticizers.

U.S. Pat. No. 4,666,972 relates to polyalkylene terephthalates which contain a fluorinated polyolefin in addition to a polymer having a glass transition temperature of less than −30° C.

U.S. Pat. No. 5,397,839 relates to elastomeric compositions having improved heat aging properties provided by blends of thermoplastic polyester resin and hydrogenated nitrile rubber. The rubber component of the composition is at least partially cured.

U.S. Pat. No. 5,550,190 to Hasegawa et al. relates to a thermoplastic elastomer composition obtained by dynamically crosslinking (A) 51–95% by weight of a thermoplastic polyester-ether elastomer and (B) 49–5% by weight of a rubber during kneading.

U.S. Pat. No. 5,637,407 to Hert et al. relates to a composite including a rubber/thermoplastic blend adherent by itself to a thermoplastic material; the blend is in the form of a thermoplastic matrix containing rubber nodules functionalized and vulcanized during the mixing with the thermoplastic. Composite articles are obtained by overmoulding the vulcanized rubber/thermoplastic blend onto the thermoplastic.

SUMMARY OF INVENTION

The thermoplastic vulcanizate composition generally has a continuous phase of a thermoplastic having a melting point of at least about 170° C. and a molecular weight sufficient to be considered an engineering plastic. A carboxylated nitrile rubber phase generally in the form of particles is made from acrylonitrile and a major amount of one or more conjugated diene monomers with butadiene or isoprene being preferred. Generally speaking, these compositions provide a product with poor processing characteristics. It was found that the addition of a processing agent allows the preparation of a processable thermoplastic product in contrast to the powdery products that are generally obtained in the absence of such agents. Curatives include phenolic resins, and addition type curing agents such as bisoxazolines and bismaleimides. The various components are dynamically vulcanized at a temperature above the melting point of the thermoplastic or the thermoplastic elastomer.

DETAILED DESCRIPTION

The thermoplastic polymers are desirably polar, crystalline, and have high melting points. The melting point of the thermoplastic polymers is desirably at least 170° C., desirably at least 200° C. and preferably at least 220° C. Excessively high melt temperatures are avoided inasmuch as during melt mixing of the thermoplastic with the carboxylated nitrile rubber, the high melt temperature will degrade the nitrile rubber. Accordingly, the thermoplastic generally has a high melting point below 260° C., and more desirably below 240° C. Suitable thermoplastic polymers include polyesters, polycarbonates, block copolymers of polyester, and the like.

Polyesters are condensation polymers. The various polyesters can be either aromatic or aliphatic or combinations thereof and are generally directly or indirectly derived from the reactions of diols such as glycols having a total of from 2 to 6 carbon atoms and desirably from about 2 to about 4 carbon atoms with aliphatic acids having a total of from about 2 to about 20 carbon atoms and desirably from about 3 to about 15 carbon atoms or aromatic acids having a total of from about 8 to about 15 carbon atoms. Generally, aromatic polyesters are preferred such as polyethyleneterephthalate (PET), polytrimethyleneterephthalate (PTT), polybutyleneterephthalate (PBT), polyethyleneisophthalate, and polybutylenenapthalate.

Various polycarbonates can also be utilized and the same are esters of carbonic acid. A suitable polycarbonate is that based on bisphenol A, e.g., poly(carbonyldioxy-1,4-phenyleneisopropylidene-1,4-phenylene).

Suitable polyester block copolymers include segmented polyester-polyether and the like. These block copolymers contain at least one block of a polyester and at least one rubbery block such as a polyether derived from glycols having from 2 to 6 carbon atoms, e.g., polyethylene glycol, or from alkylene oxides having from 2 to 6 carbon atoms. A preferred block polyester-polyether polymer is polybutyleneterephthalate-b-polytetramethylene glycol which is available as Hytrel from DuPont.

The molecular weight of the various thermoplastic resins is such that it is a suitable engineering plastic. Accordingly, the weight average molecular weight of the various polyesters generally range from about 40,000 to above 110,000 with from about 50,000 to about 100,000 being preferred.

The rubber phase of the thermoplastic vulcanizate composition of the present invention comprises carboxylated nitrile rubber. Such rubber desirably has a small particle size below 50 microns and preferably from about 1 to 10 microns to yield good physical properties and processing characteristics. Nitrile rubbers are generally derived from conjugated dienes having from 4 to 8 carbon atoms with isoprene being desired and butadiene being preferred, and from acrylonitrile. The amount of the conjugated diene content within the copolymer is generally a majority, that is, from about 50 to about 80 percent by weight, and desirably from about 60 to about 75 percent by weight. The acrylonitrile content of the copolymer is thus the corresponding minority amount, i.e., from about 20 percent to about 50 percent by weight and preferably from about 25 to about 40 percent by weight. The actual amount of acrylonitrile will vary depending upon end use application since increased amounts of acrylonitrile improve oil resistance, tensile strength, hardness and abrasion resistance. However, increased amounts of acrylonitrile in nitrile rubber will adversely affect the low temperature properties.

The nitrile rubbers utilized in the present invention contain pendant carboxyl groups thereon such as those derived from unsaturated acids, for example, acrylic acid, methacrylic acid, and the like. The amount of carboxylic acid monomer copolymerized in the nitrile rubber is generally from about 1 to about 10 parts by weight and preferably from about 3 to about 7 parts by weight based upon 100 parts by weight of the nitrile rubber derived from acrylonitrile and the conjugated diene monomers. Upon cure, the carboxylated nitrile rubber can be cross-linked via the unsaturation present in the copolymer, or alternatively via the pendent car- boxylic acid groups.

The amount of the nitrile rubber utilized in the present invention generally ranges from about 50 to about 400 parts by weight, desirably from about 200 to about 375 parts by weight, and preferably from about 230 to about 360 parts by weight for every 100 parts by weight of the one or more thermoplastic polymers.

Heretofore, polar thermoplastic vulcanizate compositions containing carboxylated nitrile rubber in absence of a processing aid generally formed a powder during processing, such as at a 1 to 3 plastic to rubber ratio. It has now been unexpectedly found that when a processing aid is added to the composition during mixing and before curing, substantial improvement in processability results. For example, powder formation is prevented and the product obtained is a processable thermoplastic material. It is also noted that bisoxazoline grafting of the plastic polymer onto the rubber via the end groups of the plastic and the carboxylic acid cure sites in the rubber may occur during TPV formation. This compatibilizing agent that can be formed in situ would also contribute to TPV mechanical properties.

The processing aids, which further act as a bulk compatiblizing agent, is generally a hydrocarbon polymer and optionally but preferably such polymers which have functional groups thereon, e.g., preferably pendant therefrom. Such hydrocarbon polymers include polyolefins derived from $C_2$ to $C_8$ monomers such as polyethylene or polypropylene. Another class of processing aids is the various copolymers of olefins with an unsaturated acid having a total of from 3 to about 10 carbon atoms such as maleic acid, acrylic acid, and the like with a suitable copolymer being poly(ethylene-acrylic acid). Ethylene-vinyl alcohol or ethylene vinyl acetate copolymers and the like are also suitable processing aids. Still another class of processing aids are various hydrocarbon based rubbers such as ethylene-propylene copolymers, ethylene-propylene-diene copolymers (i.e., EPDM), and the like. A still further class are various hydrocarbon block copolymers such as styrene-butadiene-styrene (e.g., the various Kraton® grades manufactured by Shell), styrene-ethylene-butene-styrene block copolymers, and the like.

The functional group of the processing aid can generally include any group which can react with the polar group of the thermoplastic resin, or the carboxylated nitrile rubber, or the curatives set forth herein below. Such functional groups include hydroxyl groups, as in an ethylenevinyl alcohol copolymer, with acid groups or anhydride groups being preferred. The acid groups are generally obtained from unsaturated acids having from 3 to 10 carbon atoms such as acrylic acid, methacrylic acid, maleic acid, fumaric acid, and the like. The anhydrides include the various anhydrides of the above acids with maleic anhydride being preferred. The amount of the entire functional compound is generally from about 0.2 to about 6 or 10 percent by weight of the total weight of the above-noted processing aids.

Preferred processing aids which also act as compatibilizing aids include maleated polyethylene, maleated polypropylene, an ethylene-acrylic acid copolymer, maleated styrene-ethylene-butene-styrene-block copolymers, maleated styrene-butadiene-styrene block copolymers, maleated ethylene-propylene rubber, blends and cured blends of polypropylene or polyethylene and EPDM rubber (e.g., Santoprene® having a hardness of from about 35 Shore A to about 50 Shore D), and the like. Maleated polyethylene, maleated ethylene-propylene rubber and maleated styrene-butadiene-styrene block copolymers are highly preferred.

The amount of the processing and/or compatibilizing aids generally range from about 3 parts to about 30 parts by weight and preferably from about 5 parts to about 20 parts by weight based upon 100 parts by weight of the thermoplastic resin.

The utilization of the processing aids with the carboxyl containing nitrile rubbers results, after dynamic vulcanization, in the formation of a highly compatible blend wherein the thermoplastic or thermoplastic elastomer generally constitutes a continuous phase and the rubber particles constitute a discontinuous phase. However, other possible morphologies may exist.

Another important aspect of the present invention is the utilization of addition type curatives which, do not break down the plastic phase and do not form volatile compounds such as water. While other curing agents can be utilized such as free radical generating compounds, the same are not desired and thus used in small amounts such as generally less than 1.0 parts by weight and desirably less than 0.5 parts by weight based upon 100 parts by weight of the carboxylated nitrile rubber. A highly preferred addition curative or cross-linking agent is the various oxazolines or oxazines such as those having the formula

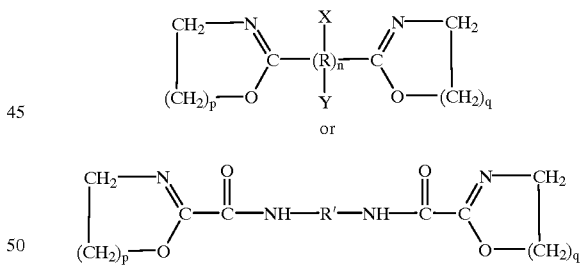

wherein R or R' is an aliphatic or aromatic hydrocarbon group such as alkylene or arylene having 1 to 24 carbon atoms optionally substituted with one or more alkyl groups having 1 to 6 carbon atoms or substituted with an aryl group having 6 to 9 carbon atoms; n is 0 or 1, when n equals 1 then X and Y are hydrogen atoms or independently an 2-oxazoline group or a 1,3-oxazine group, or a 2-oxazoline group or a 1,3-oxazine group and a hydrogen atom, with the remaining carbon atoms having hydrogen atoms thereon, p and q, independently, is 1 or 2, and when n equals 0 then R, X , and Y are nonexistent. Further, each oxazoline group of the above formula may optionally be substituted with an alkyl of 1 to 6 carbon atoms. Further descriptions of said polyvalent oxazolines are set forth in U.S. Pat. No. 4,806,588, herein incorporated by reference. Preferred oxazolines include 2,2'-bis(oxazoline-2), 2,2'hexamethylenedicarbamoylbis(oxazoline-2), and 1,3-phenylene-2,2'bis(oxazoline-2).

Various bismaleimides as well as phenolic resins can also be used as curatives. Examples of bismaleimides include a bismaleimide based on methylene dianiline (e.g., Matrimid 5292A from Ciba-Geigy), a bismaleimide based on toluene diamine (e.g., HVA-2 from DuPont), and the like. The phenolic curing agents are well known to the art and literature and include polymers obtained by the polymerization of phenol with formaldehyde. The polymerization rate is pH dependent, with the highest reaction rates occurring at both high and low pH. A more detailed description of the preparation of phenolic resins is set forth in "Principles of Polymerization" 3rd Edition, George Odian, pages 125–131, John Wiley Sons, Inc., New York., N.Y., 1991, which is hereby fully incorporated by reference. Examples of specific phenolic resins include

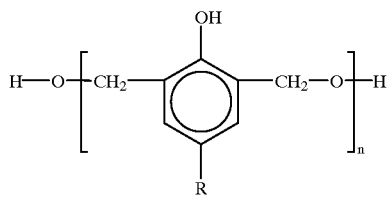

such as SP-1045 where R is isooctyl and n is 1 to 12, and HRJ-1367 where R is t-butyl and n is from 1 to 10, from Schenectedy Chemicals.

Other addition type curatives can be utilized including various isocyanates such as 1,4-phenylenediisocyanate, isophorone diisocyanate, and α, ω-isocyanate terminated polymers; various carbodiimides such as poly(triisopropylphenylene carbodiimide) i.e., Stabaxol-P from Rhein Chemie, and the like, as well as various bisimidazolines.

The multifunctional imidazolines have the formula

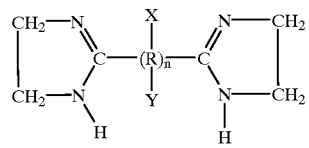

where R and n are defined as above for the multifunctional (polyvalent) oxazolines and X and Y, are a hydrogen atom, or, independently, an imidazoline group, or an imadazoline group and an hydrogen atom. A preferred multifunctional imidazoline is bismidazoline.

Still another group of addition type curatives are the various multifunctional epoxides such as the various Shell Epon® resins, epoxidized vegetable oils, tris(2,3-epoxypropyl)isocyanate, and 4,4'-methylene bis(N,N-diglycidylaniline), and multifunctional aziridines.

The amount of the curative is generally from about 1 to 12, desirably from 2 to 10, and preferably from about 2.5 to about 7 parts by weight for every 100 parts by weight of the carboxylated nitrile rubber. The addition curatives effect cross-linking by reacting with the carboxylic acid groups present in the nitrile rubber or double bonds of the diene hydrocarbon portion derived from the diene monomer. The amount of curatives used results in at least a partially cured nitrile rubber and preferably a fully or completely vulcanized nitrile rubber.

The terms "fully vulcanized" and "completely vulcanized" as used in the specification and claims means that the rubber component to be vulcanized has been cured to a state in which the elastomeric properties of the cross-linked rubber are similar to those of the rubber in its conventional vulcanized state, apart from the thermoplastic vulcanizate composition, or as indicated by no more change in tensile strength. The degree of cure can be described in terms of gel content or, conversely, extractable components. Alternatively, the degree of cure may be expressed in terms of cross-link density. All of these descriptions are well known in the art, for example, in U.S. Pat. Nos. 5,100,947 and 5,157,081, both of which are fully incorporated herein by this reference. By the term "partially vulcanized" (i.e., degree of cure), it is meant that about 30 percent or less and desirably about 10 percent or less by weight of a carboxylated nitrile rubber is soluble in methyl ethyl ketone at 80° C. By the term "fully vulcanized" (i.e., degree of cure), it is meant that about 5 percent or less of the cured carboxylated nitrile rubber is soluble in a methyl ethyl ketone at 80° C.

In addition to the thermoplastic resin, nitrile rubber, the processing aid, and the curative, the compositions of the present invention can include various conventional additives such as reinforcing and non-reinforcing fillers, extenders, antioxidants, stabilizers, rubber processing oil, extender oils, lubricants, plasticizers, anti-blocking agents, anti-static agents, waxes, foaming agents, pigments, flame retardants and other processing aids known in the rubber compounding art. Such additives can comprise up to about 60 weight percent of the total composition, and can be in the plastic phase, the rubber phase or both. Fillers and extenders which can be utilized include conventional inorganics such as calcium carbonate, clays, silica, talc, titanium dioxide, carbon black, and the like. The rubber processing oils generally are paraffinic, naphthenic or aromatic oils derived from petroleum fractions. The type will be that ordinarily used in conjunction with the specific rubber or rubbers present in the compositions, and the quantity based on the total rubber content may range from zero to about 100 phr and preferably from about 10 to about 40 phr.

Partial or preferably complete cross-linking can be achieved by adding one or more of the above-noted rubber curatives to the blend of a thermoplastic or the thermoplastic elastomer and rubber and vulcanizing the rubber to the desired degree under conventional vulcanizing conditions. However, it is preferred that the rubber be cross-linked by the process of dynamic vulcanization. As used in the specification and claims, the term "dynamic vulcanization" means a vulcanization or curing process for a rubber contained in a thermoplastic vulcanizate composition, wherein the rubber is vulcanized under conditions of shear at a temperature above the melting point of the polyester component. The rubber is thus simultaneously cross-linked and dispersed as fine particles within the polyester matrix, although as noted above, other morphologies may also exist. Dynamic vulcanization is effected by mixing the thermoplastic vulcanizate components at elevated temperature in conventional mixing equipment such as roll mills, Banbury mixers, Brabender mixers, continuous mixers, mixing extruders, and the like. The unique characteristic of dynamically cured compositions is that, notwithstanding the fact that the rubber component is partially or fully cured, the compositions can be processed and reprocessed by conventional plastic processing techniques such as extrusion, injection molding, blow molding and compression molding. Scrap or flashing can be salvaged and reprocessed.

The following general procedure was used in the preparation of thermoplastic vulcanizates of the present invention as set forth in the examples. Thermoplastic polyester, nitrile rubber, and the processing aids were mixed in a Brabender mixer at a temperature sufficient to melt the thermoplastic and form a blend. Curatives were then added to cross-link the rubber and mixing was continued until a maximum melt consistency was reached, usually between one and five minutes, then for an additional two to three minutes thereafter. The sequence of ingredient addition may vary, but generally all of the fillers should be added before substantial cross-linking, or vulcanization occurs. The stabilizers and plasticizers may be added either before or after vulcanization. The vulcanized composition was removed from the mixer, sheeted, and compression molded at 30° to 50° C. above the melting point of the thermoplastic component, and cooled below 100° C. under pressure. Properties of the molded sheet were then measured.

The thermoplastic vulcanizate compositions of the present invention generally have good tensile strength, good elongation and good compression set properties. Most notably, they have very low oil swell, i.e., excellent oil resistance properties comparable to that of the thermoset nitrile rubber. Oil swell values as measured by the percent of weight gain at 150° C. for 72 hours is generally 25 percent or less, desirably 20 percent or less, and preferably 15 percent or less.

The thermoplastic vulcanizate compositions of the present invention can be used in applications wherever nitrile rubber is used. Thus they can be utilized as seals, as gaskets, hoses, boots, and the like, especially for automotive applications. The invention will be better understood by reference to the following examples which serve to illustrate, but not to limit, the present invention.

Thermoplastic vulcanizates (TPVs) were produced in a laboratory Brabender-Plasticorder, model EPL-V5502. The mixing bowl had a capacity of 60 ml with roller type rotors, which gave good mixing for samples with a batch weight of 40–45 grams. For higher batch weight TPVs, less bulky cam rotors were used, which gave a bowl capacity of 85 ml. TPVs were prepared at 240° C. and at 75-rpm rotor speed, unless indicated otherwise. The plastic materials were melted or partially melted in the mixer cavity prior to rubber addition. After a steady torque was obtained for 1 to 2 minutes in order to ensure as complete a homogenization as possible of the rubber and plastic melt blend, the curative was added and curing continued for about 8 minutes. The torque rise observed on curing leveled off after about 4 to 5 minutes into the cure. The TPV obtained was sheeted when hot in a cold press, and subsequently compression molded at 250° C. in order to produce plaques for physical testing. Plasticizers were added to the rubber and plastic melt blended prior to cure. When melt blending the plastic and rubber materials, it is important to at least partially melt the plastic prior to rubber addition. Masticating the rubber alone in the mixer will lead to thermooxidative crosslinking of the rubber which results in powdering of the rubber.

Utilizing the above general procedure, specific recipes as set forth in Tables 1–4 were formulated and prepared.

TABLE I

| Example | 1 | 2 | 3 | 4 | 5 | 6 | 7 | 8 | 9 | 10 |
|---|---|---|---|---|---|---|---|---|---|---|
| Composition | | | | | | | | | | |
| Nipol 1072 × 28 | 76 | 76 | 76 | 68 | 68 | 70 | 80 | 76.5 | 76.5 | 76 |
| Valox 315 | 24 | 24 | 24 | 32 | 32 | 30 | 20 | 23.50 | 23.50 | 24 |
| 1,3-PBO | — | — | — | 2.27 | 2.27 | 2.12 | 2.87 | — | — | — |
| Polybond 3009 | — | — | 2.38 | — | 4.53 | 2.12 | 2.49 | 2.35 | 2.35 | 2.38 |
| SP-1045 | — | 3.56 | 3.56 | — | — | — | — | — | — | — |
| Ultramox 626 | — | — | — | — | — | — | — | 1.56 | 1.56 | — |
| TPAP | — | — | — | — | — | — | — | — | — | 5.12 |
| Irganox B225 | — | — | — | — | — | — | — | — | — | 3.14 |
| HVA-2 | — | — | — | — | — | — | — | 2.51 | — | — |
| Matrimid 5292A | — | — | — | — | — | — | — | — | 2.51- | — |
| Properties | | | | | | | | | | |
| Hardness (Shore A) | 67 | 78 | 79 | 85 | 87 | 86 | 79 | 83 | 83 | 79 |
| UTS (psi) | 1208 | 1756 | 1891 | 2423 | 2855 | 3271 | 1803 | 2563 | 2515 | 1849 |
| UE (%) | 205 | 193 | 216 | 203 | 243 | 256 | 202 | 254 | 247 | 231 |
| M 100 (psi) | 700 | 946 | 966 | 1317 | 1393 | — | 883 | 1057 | 1063 | 874 |
| CS (%, 22 hr, 100° C.) | — | 9 | 10 | 17 | 18 | 19 | 11 | 13 | 15 | — |
| CS (%, 22 hr, 150° C.) | — | 29 | 29 | 40 | 35 | 35 | 23 | 29 | 29 | 52 |
| Wt. Gain (%, 72 hr, 150° C.) | — | 18 | 23 | 15 | 21 | 17 | 22 | 19 | 18 | 16 |
| Tension Set(%) | 13 | 9 | 11 | 16 | 18 | 13 | 7 | 11 | 11 | 9 |
| Consistency of Product | T | P | T | P | T | T | T | T | T | T |

T: Thermoplastic - P: Powder

TABLE II

| Example | 11 | 12 | 13 | 14 | 15 | 16 |
|---|---|---|---|---|---|---|
| Composition | | | | | | |
| Nipol 1072 × 28 | 75 | 76 | 76 | 76 | 76 | 76 |
| Valox 315 | 25 | 24 | 24 | 24 | 24 | 24 |
| 1,3-PBO | 2.34 | 2.38 | 2.38 | 2.38 | 2.38 | 2.41 |
| Polybond 3009 | — | 2.38 | — | — | — | — |
| Royaltuf 490 | — | — | — | — | — | 7.22 |
| Kraton FG-1901X | — | — | — | 2.38 | — | — |
| Irganox B225 | 3.10 | 3.14 | 3.14 | — | — | 2.24 |
| HD 6706.19 | — | — | 2.38 | — | 2.38 | — |
| Properties | | | | | | |
| Hardness (Shore A) | — | — | — | 79 | 81 | 73 |
| UTS (psi) | — | — | — | 2289 | 2048 | 1277 |
| UE (%) | — | — | — | 238 | 225 | 188 |
| M 100(psi) | — | — | — | 915 | 923 | 669 |
| CS (%, 22 hr, 150° C.) | — | — | — | 30 | 32 | — |
| Wt. Gain (%, 72 hr, 150° C.) | — | — | — | 18 | 18 | — |

TABLE II-continued

| Example | 11 | 12 | 13 | 14 | 15 | 16 |
|---|---|---|---|---|---|---|
| Tension Set (%) | — | — | — | 7 | 8 | 6 |
| Consistency of Product | P | T | T | T | T | T |

P: Powder
T: Thermoplastic

TABLE III

| Example | 17 | 18 | 19 |
|---|---|---|---|
| Composition | | | |
| Nipol 1072 x 28 | 76 | 76 | 69.00 |
| Irganox B225 | 3.17 | — | — |
| 75PBT/25PBI | 24 | — | — |
| PET 13339 | — | 24 | — |
| Hytrel 8238 | — | — | 31.00 |
| Polybond 3009 | 2.38 | 2.38 | 2.37 |
| 1,3-PBO | 2.38 | 3.40 | 3.04 |
| Properties | | | |
| Hardness (Shore A) | 79 | 82 | 85 |
| UTS (psi) | 1911 | 1566 | 2630 |
| UE (%) | 253 | 161 | 242 |
| M 100 (PSI) | 773 | 1052 | 1144 |
| CS (%, 22 hr, 100° C.) | 20 | 14 | 25 |
| CS (%, 22 hr, 150° C.) | 40 | 26 | 40 |
| Wt. Gain (%, 72 hr, 150° C.) | 19 | 20 | — |
| Tension Set (%) | 7 | 11 | 12 |
| Consistency of Product | T | T | T |

T: Thermoplastic

Gel content: 50–60 weight percent in methyl ethyl ketone (Zeon Chemicals, Inc., Louisville, Ky.).

Nipol DN3635: Gel free nitrile rubber. Bound acrylonitrile: 36 weight percent (Zeon Chemicals, Inc., Louisville, Ky.).

Chemigum HR 665: Nitrile rubber with bound antioxidant and 34 weight percent bound acrylonitrile (Goodyear Tire and Rubber Company, Akron, Ohio).

Plastic Materials

Valox 315: Poly(tetramethylene terephthalate) with weight average molecular weight of about 105,000, and number average molecular weight of about 50,000 (GE Plastics, Pittsfield, Mass.).

75PBT/25PBI: 75:25 weight percent poly(butylene terephthalate/isophthalate) experimental polymer (AMOCO Chemicals, Naperville, Ill.).

PET 13339: Modified poly(ethylene terephthalate), m.p. 235° C. (Eastman Chemical Company, Kingsport, Tenn.).

Hytrel 8238: Polyester-ether segmented block copolymer thermoplastic elastomer with 82 Shore D hardness (DuPont Company, Wilmington, Del.).

Processing Aids

Royaltuf 490: Maleated EPDM rubber with 1 weight percent bound maleic anhydride (Uniroyal Chemical Company, Middlebury, Conn.).

Kraton FG-1901X: Maleated styrene/ethylene-butene/styrene triblock copolymer with 2 weight percent bound maleic anhydride (Shell Chemical Company, Houston, Tex.).

Polybond 3009: Maleated high-density polyethylene with 1 weight percent bound maleic anhydride (Uniroyal Chemical Company, Middlebury, Conn.).

TABLE IV

| Example | 20 | 21 | 22 | 23 | 24 | 25 | 26 | 27 | 28 | 29 | 30 |
|---|---|---|---|---|---|---|---|---|---|---|---|
| Composition | | | | | | | | | | | |
| Nipol 1072 x 28 | 65 | 65 | 65 | 70 | 76 | 76 | 70 | 76 | 76 | 76 | 76 |
| Valox 315 | 35 | 35 | 35 | 30 | 24 | 24 | 30 | 24 | 24 | 24 | 24 |
| Polybond 3009 | 2.58 | 2.57 | 2.57 | 6.55 | 2.38 | 2.39 | 6.56 | 2.38 | 2.38 | 2.38 | 2.41 |
| 1,3-PBO | 2.03 | 2.04 | 2.04 | 2.18 | 2.40 | 2.41 | 2.19 | 2.38 | 2.38 | 2.38 | 2.41 |
| Irganox B225 | 3.14 | 3.14 | 3.14 | 2.18 | 2.29 | 2.29 | 2.45 | 2.29 | 2.29 | 2.29 | 2.29 |
| Reofos 50 | — | 16.32 | 25.35 | — | — | — | — | — | — | — | 11.39 |
| Uniplex 809 | — | — | — | — | 7.71 | — | — | — | — | — | — |
| Uniplex 413 | — | — | — | — | 7.67 | — | — | — | — | — | — |
| Plalsthall BSA | — | — | — | — | — | 18.75 | — | — | — | — | — |
| Paraplex G30 | — | — | — | — | — | — | — | 17.62 | — | — | — |
| Remarc P-40-60 | — | — | — | — | — | — | — | 11.50 | — | — | — |
| Calsol 8450 | — | — | — | — | — | — | — | — | 7.76 | — | — |
| Calsol 5120 | — | — | — | — | — | — | — | — | — | 7.71 | — |
| Flexxon 885 | — | — | — | — | — | — | — | — | — | — | 7.60 |
| Properties | | | | | | | | | | | |
| Hardness (Shore A) | 90 | 86 | 83 | 86 | 77 | 71 | 82 | 72 | 78 | 76 | 65 |
| UTS (psi) | 2709 | 1927 | 1698 | 2643 | 1672 | 1595 | 1771 | 1533 | 1891 | 1664 | 1103 |
| UE (%) | 249 | 231 | 235 | 262 | 250 | 254 | 248 | 251 | 239 | 230 | 204 |
| M 100 (PSI) | 1447 | 1034 | 902 | 1230 | 687 | 623 | 880 | 644 | 779 | 758 | 602 |
| CS (%, 22 hr, 100° C.) | 19 | 19 | 21 | 20 | — | 13 | 18 | — | — | — | 14 |
| CS (%, 22 hr, 150° C.) | 36 | 36 | 36 | 38 | 34 | 29 | 34 | — | — | — | 34 |
| Wt. Gain (%, 72 hr, 150° C.) | 14 | 1 | -4 | 18 | 4 | 8 | 9 | — | — | — | 5 |
| Tension Set (%) | 19 | 13 | 13 | 16 | 9 | 5 | 13 | 7 | 8 | 7 | 7 |
| Consistency of Product | T | T | T | T | T | T | T | T | T | T | T |

T: Thermoplastic

Elastomeric Materials

Nipol 1072 X 28: Carboxylic acid functional nitrile rubber. Bound acrylonitrile ~27 weight percent. Carboxylic acid content: ~0.08 equivalents per hundred parts of rubber.

HD 6706.19: High-density polyethylene (Exxon Chemical Company, Houston, Tex.).

Crosslinking Compounds 1,3-PBO: 1,3-phenylenebis2,2'-(oxazoline-2) (Tramaco Japan Ltd., Tokyo, Japan).

SP-1045: Alkylated phenol/formaldehyde resin (Schenectady International,, Inc., Schenectady, N.Y.).

HVA-2: 2,4-bismaleimidotoluene (DuPont Dow Elastomers, Stow, Ohio).

Matrimid 5292A: Bis(4-maleimidophenyl)methane (Ciba-Geigy Corporation, Brewster, N.Y.).

TPAP: Trimethylolpropane tris(2-methyl-1-aziridenepropionate) (Aldrich Chemical Company, Milwaukee, Wis.).

Plasticizers

Reofos 50: Isopropylated triphenyl phosphate (C.P. Hall Company, Stow, Ohio).

Uniplex 809: Polyethylene glycol bis(2-ethylhexanoate) (Unitex Corporation, Greensboro, N.C.).

Uniplex 413: Substituted benzenesulfonamide (Unitex Corporation, Greensboro, N.C.).

Plasthall BSA: N-n-butylblenzenesulfonamide (C. P. Hall Company, Stow, Ohio).

Paraplex G-30: Mixed dibasic acid polyester (C. P. Hall Company, Stow, Ohio).

Remarc P-40–60: Chlorinated paraffinic oil with 39 weight percent chlorine (Harwick Chemical Corporation, Akron, Ohio).

Calsol 8450; 5120: Napthenic process oil (Sun Company, Canton, Ohio).

Flexon 885: Paraffinic process oil (Exxon Oil Company, Houston, Tex.).

Antioxidant

Irganox B225: Phenolic/Phosphite based antioxidant (Ciba Specialty Chemicals Corporation, Troy, Mich.).

Example 1 describes the preparation of a thermoplastic blend of carboxylated nitrile rubber and poly(butylene terephthalate).

EXAMPLES

Table I illustrates the effects of processing aids on cured compositions of carboxylated nitrile rubber and PBT.

On curing the blend of Example 1 with phenolic resin, a sticky and powdery product was isolated (Example 2). The compression molded plaque of this powdery product, however, exhibited good mechanical properties. In Example 3, the addition of maleated high density polyethylene (Polybond 3009) to the recipe of Example 2 yielded a TPV that did not powder and could be easily removed from the mixer. It should be noted that the mechanical properties of the TPVs are considerably better than that of the uncured blend of Example 1.

Attempted TPV preparation from a blend of carboxylated nitrile rubber and poly(butylene terephthalate) with the use of 1,3-phenylenebis-2,2'-(oxazoline-2) as a curative also yielded a sticky and powdery product (Example 4) in the absence of a process aid. The use of a process aid along with the oxazoline curative allowed the production of a thermoplastic product that could be readily removed from the mixer cavity (Example 5). Example 6 illustrates the preparation of a TPV with a reduced amount of process aid when compared to the amount used in Example 5. In general, the lower the plastic content in a TPV recipe, the greater the chances of the production of an unprocessable product. The use of Polybond 3009 allows the preparation of a processable TPV unit with extremely low plastic to rubber ratio (20:80, Example 7).

Examples 8–10 demonstrate the production of processable TPVs based upon carboxylated nitrile rubber, poly (butylene terephthalate), and a maleated high density polyethylene process aid, with maleimide and aziridine curatives.

Table II illustrates the use of different processing aids.

In Example 11, a melt blend of Nipol 1072 x 28 and Valox 315 (75:25 rubber to plastic weight ratio) was produced at 240° C. and 75 rpm cam rotor speed. After adding the 1,3-PBO curative, the rotor speed was increased to 200 rpm and curing was continued at this speed for 9 minutes. During the cure, shear heating caused the material temperature to rise to 296° C. A "crumbly" product that stuck to the mixer cavity was the result. The procedure of Example 11 was repeated where part of the plastic phase (Valox 315) was replaced either with high-density polyethylene or maleated high-density polyethylene (Examples 12 and 13). In both cases, the material obtained was cleanly removed from the mixer and only slightly more "crumbly" when compared with the corresponding experiments where the curing was conducted at 75 rpm. These examples illustrate further the importance of a process aid in the production of the thermoplastic TPVs of this invention.

Examples 14, 15, and 16 document the properties of processable TPVs obtained with the aid of a maleated styrene/ethylene butene/styrene triblock copolymer of a high density polyethylene and a maleated EPDM rubber, respectively. When maleated EPDM is the process aid, soft compositions can be obtained.

Table III illustrates the use of different thermoplastic resins.

Various polyester based plastic materials such as poly (butylene terephthalate-co-isophthalate) (Example 17), a modified polyethylene terephthalate) (Example 18), and a poly(butylene terephthalate)/poly(tetramethylene glycol) segmented block copolymer (Example 19) can also be used in the practice of this invention.

Table IV illustrates the applicability of plasticizers.

The hard TPV composition of Example 20 was plasticized to softer compositions in Examples 21 and 22 with the aid of an isopropylated triphenyl phosphate as plasticizer. About 63 grams of the TPVs of Examples 20–22 were passed through a small single screw extruder at 500° F. Good melt strength was observed for these TPVs, with the plasticized TPVs exhibiting good surface smoothness. The fair surface smoothness of the TPVs of Example 20 was improved in a formulation containing additional Polybond 3009 (Example 23). Examples 24–30 illustrate the suitability of various polar and nonpolar plasticizers. In the practice of this invention.

While in accordance with the Patent Statutes, the best mode and preferred embodiment has been set forth, the scope of the invention is not limited thereto, but rather by the scope of the attached claims.

What is claimed is:

1. A thermoplastic vulcanizate composition comprising a blend of
   a) a thermoplastic selected from the group consisting of polyester, polycarbonate, polyester block copolymer or combinations thereof, and having a melting point of at least 170° C.,
   b) from about 200 to about 375 parts by weight of carboxylated nitrile rubber per 100 parts by weight of said thermoplastic,
   c) from about 1 to about 12 parts by weight of an addition type curing agent per 100 parts by weight of said rubber, and
   d) from about 3 to about 30 parts by weight per 100 parts by weight of said thermoplastic of a processing aid selected from the group consisting of an an ethylene-acrylic acid copolymer, maleated polyethylene, maleated polypropylene, maleated ethylene-propylene rubber, a maleated block copolymer of styrene-butadiene-styrene, a maleated block copolymer of styrene-ethylene-butene-styrene, or combinations thereof, wherein said rubber has been at least partially cured by said curing agent.

2. A thermoplastic vulcanizate composition according to claim 1, wherein said thermoplastic is poly(butylene terephthalate), poly(ethylene terephthalate), or combinations thereof, and wherein said nitrile rubber contains from 3 to 7 parts by weight of said carboxylic acid repeat groups therein.

3. A thermoplastic vulcanizate composition according to claim 2, wherein said processing aid is maleated polyethylene, and wherein said curative is 2,2'-bis(oxazoline-2), 2,2'hexamethylenedicarbamoylbis(oxazoline-2), 1,3-phenylene-2,2'bis(oxazoline-2), or combinations thereof.

4. A thermoplastic vulcanizate composition according to claim 3, wherein said composition has an oil swell weight gain of 15 percent or less at 150° C. for 72 hours.

5. A thermoplastic vulcanizate composition according to claim 4, wherein said carboxylated nitrile rubber has been dynamically vulcanized and wherein the degree of cure is at least 95 percent.

6. A thermoplastic vulcanizate composition according to claim 1, wherein said composition has an oil swell weight gain of 25 percent or less at 150° C. for 72 hours.

7. A thermoplastic vulcanizate composition according to claim 1, wherein said composition has an oil swell weight gain of 20 percent or less at 150° C. for 72 hours.

8. A thermoplastic vulcanizate composition according to claim 1, wherein said carboxylated nitrile rubber has been dynamically vulcanized and wherein the degree of cure is at least 80 percent.

9. A thermoplastic vulcanizate composition according to claim 1, wherein said carboxylated nitrile rubber has been dynamically vulcanized and wherein the degree of cure is at least 90 percent.

10. A thermoplastic vulcanizate composition according to claim 1, wherein the repeat groups containing carboxylic acid groups in said nitrile rubber are from about 1 to about 10 parts by weight based upon 100 parts by weight of the conjugated diene and the acrylonitrile repeat groups in said nitrile rubber.

11. A thermoplastic vulcanizate composition according to claim 1, wherein said addition type curative is an oxazoline, an oxazine, a phenolic resin, a bismaleimide, an isocyanate, a carbodiimide, a bisimidazoline, a multifunctional epoxide, a multifunctional aziridine, or combinations thereof.

12. A process for preparing a thermoplastic vulcanizate comprising dynamically vulcanizing a blend of
   a) a thermoplastic selected from the group consisting of polyester, polycarbonate, polyester block copolymer or combinations thereof, and having a melting point of at least 170° C.,
   b) from about 200 to about 375 parts by weight of carboxylated nitrile rubber per 100 parts by weight of said thermoplastic,
   c) from about 1 to about 12 parts by weight of an addition type curing agent per 100 parts by weight of said rubber, and
   d) from about 3 to about 30 parts by weight per 100 parts by weight of said thermoplastic of a processing aid selected from the group consisting of an ethylene-acrylic acid copolymer, maleated polyethylene, maleated polypropylene, maleated ethylene-propylene rubber, a maleated block copolymer of styrene-butadiene-styrene, a maleated block copolymer of styrene-ethylene-butene-styrene, or combinations thereof.

13. A process according to claim 12, wherein said thermoplastic is poly(butylene terephthalate), poly(ethylene terephthalate), or combinations thereof, wherein said nitrile rubber contains from 3 to 7 parts by weight of said carboxylic acid repeat groups therein, wherein said vulcanizate is at least 90 percent cured, and wherein the amount of said processing aid is from about 5 to about 20 parts by weight per 100 parts by weight of said thermoplastic.

14. A process according to claim 13, wherein said processing aid is maleated polyethylene, and wherein said curative is 2,2'-bis(oxazoline-2), 2,2'hexamethylenedicarbamoylbis(oxazoline-2), and 1,3-phenylene-2,2'bis(oxazoline-2), or combinations thereof.

15. A process according to claim 13, wherein said composition has an oil swell weight gain of 15 percent or less at 150° C. for 72 hours.

16. A process according to claim 12, wherein said composition has an oil swell weight gain of 25 percent or less at 150° C. for 72 hours.

17. A process according to claim 12, wherein the repeat groups containing carboxylic acid groups in said nitrile rubber are from about 1 to about 10 parts by weight based upon 100 parts by weight of the conjugated diene and the acrylonitrile repeat groups in said nitrile rubber.

18. A process according to claim 12, wherein said addition type curative is an oxazoline, an oxazine, a phenolic resin, a bismaleimide, an isocyanate, a carbodiimide, a bisimidazoline, a multifunctional epoxide, a multifunctional aziridine, or combinations thereof.

* * * * *